(12) United States Patent
V et al.

(10) Patent No.: US 12,260,077 B1
(45) Date of Patent: Mar. 25, 2025

(54) CUSTOMIZING USER INTERFACES BASED ON NEURODIVERSE CLASSIFICATION

(71) Applicant: Citibank, N.A., New York, NY (US)

(72) Inventors: Paul Prem Rajah V, Madurai (IN); Rajkumar Mahalingam, Krishnagiri (IN); Shenilton R. S, Kanyakumari (IN); A Francis, Chennai (IN)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 18/474,115

(22) Filed: Sep. 25, 2023

(51) Int. Cl.
*G06F 3/04845* (2022.01)
*G06F 9/54* (2006.01)

(52) U.S. Cl.
CPC ............ *G06F 3/04845* (2013.01); *G06F 9/54* (2013.01)

(58) Field of Classification Search
CPC ...... G06F 3/04845; G06F 3/0484; G06F 9/54; G06F 9/46; G06N 20/00
USPC .............................................. 715/764; 706/12
See application file for complete search history.

(56) References Cited

U.S. PATENT DOCUMENTS

| | | | | |
|---|---|---|---|---|
| 8,966,036 B1* | 2/2015 | Asgekar | ................. | H04W 4/08 707/706 |
| 2007/0180386 A1* | 8/2007 | Ballard | ............... | G06F 16/9577 715/744 |
| 2014/0317726 A1* | 10/2014 | Turgeman | ............. | H04W 12/06 726/19 |
| 2015/0100897 A1* | 4/2015 | Sun | ........................ | G06Q 10/10 715/753 |
| 2017/0140285 A1* | 5/2017 | Dotan-Cohen | ......... | G06F 9/453 |
| 2017/0212650 A1* | 7/2017 | Sinyagin | ................. | G06F 9/453 |
| 2017/0262164 A1* | 9/2017 | Jain | ...................... | G06F 3/04847 |
| 2018/0365025 A1* | 12/2018 | Almecija | ............... | G06F 3/0482 |
| 2020/0226418 A1* | 7/2020 | Dorai-Raj | ............. | G06F 16/313 |
| 2021/0042638 A1* | 2/2021 | Novotny | ................. | G06N 20/00 |
| 2021/0081087 A1* | 3/2021 | Wayne | .............. | G06F 16/24578 |
| 2021/0236044 A1* | 8/2021 | Arroyo-Gallego | .... | A61B 5/225 |
| 2021/0385318 A1* | 12/2021 | Delaney | ................ | G06F 3/0481 |
| 2022/0091726 A1* | 3/2022 | Azmoon | ................ | G06N 20/00 |
| 2022/0366002 A1* | 11/2022 | Ekron | ....................... | G06F 8/34 |

OTHER PUBLICATIONS

Yang et al., "Automatic User Interface Generating for Simple Interaction in Pervasive Computing", 2017 IEEE International Conference on Computational Science and Engineering (CSE) and IEEE International Conference on Embedded and Ubiquitous Computing (EUC), vol. 2, pp. 3-8, Jul. 2017. (Year: 2017).*

(Continued)

*Primary Examiner* — Hwei-Min Lu
(74) *Attorney, Agent, or Firm* — Perkins Coie LLP

(57) ABSTRACT

Systems and methods are described herein for novel uses and/or improvements for customizing user interfaces for neurodiversity categories using machine learning models. In particular, one or more neurodiversity categories corresponding to a user are identified based on inputting user interaction data into a machine learning model. Based on the output of the machine learning model of one or more neurodiversity categories, user interface parameters are determined for those neurodiversity categories and a customized user interface is generated based on the user interface parameters. One or more applications with which the user interacts are then updated using the customized user interface.

19 Claims, 7 Drawing Sheets

(56) References Cited

OTHER PUBLICATIONS

Zouhaier et al., "A Reinforcement Learning Based Approach of Context-driven Adaptive User Interfaces", 2021 IEEE 45th Annual Computers, Software, and Applications Conference (COMPSAC), Jul. 2021, pp. 1463-1468. (Year: 2021).*

Holmes et al., "A novel framework to estimate cognitive impairment via finger interaction with digital devices", Brain Communications, 4(4), faca194, Jul. 28, 2022. (Year: 2022).*

* cited by examiner

CUSTOMIZING USER INTERFACES BASED ON NEURODIVERSE CLASSIFICATION

BACKGROUND

User interface development has been an important branch of computer science for many years. Engineers have been developing user interfaces that enable easy consumption of visual and audio information. In recent years, engineers have been developing interfaces that are more and more flexible, enabling users to customize many interface settings so that users are able to digest information in the best and most efficient way possible. However, certain categories of users may not be able to use these interfaces efficiently because these users are neurodivergent—they are people whose brains work differently—and, as a result, do not process user interfaces in the same manner as regular users' brains. Neurodiversity is a vast spectrum that includes people with neurological or developmental conditions such as an autism spectrum disorder (ASD) or Attention-deficit/hyperactivity disorder (ADHD). Being Neurodivergent is not considered as a deficit, but a difference. In many cases, such individuals do not know that they are neurodiverse and consider themselves as normal. Thus, generally, it may be difficult to identify neurodiverse people. Some estimates indicate that around fifteen percent of people are neurodivergent and that up to half of those people are unaware of their condition. Moreover, neurodiversity is a vast spectrum with users affected with various degrees of disability.

In addition, in recent years, the use of artificial intelligence, including, but not limited to, machine learning, deep learning, etc. (referred to collectively herein as artificial intelligence), has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. Thus, it may be desirable to use artificial intelligence (e.g., machine learning) to modify user interfaces for people who are neurodivergent.

SUMMARY

Accordingly, systems and methods are described herein for novel uses and/or improvements for customizing user interfaces for neurodiversity categories using machine learning models. An interface configuration system may be used to perform operations for customizing user interfaces for neurodiversity categories. In many instances, users may be interacting with a user/client device (e.g., a smartphone, an electronic tablet, or another suitable user device). The interface configuration system may reside (at least partially) on that device and at least partially on a server to perform operations described below.

The interface configuration system may include a client device component which may collect user interaction data on one or more client devices. The server component of the interface configuration system may receive user interaction data (e.g., as the user interacts with an application on a client device). The user interaction data may include one or more of key stroke dynamics data, navigation pattern data, or interaction pattern data. For example, the application on the client device may collect key latency (e.g., how fast a user presses keys of a keyboard or how fast the user presses virtual keys on a touch screen display), dwell time, frequency, rhythm, and/or other key stroke dynamics. The application may also collect journey patterns (e.g., time taken in screen navigation, screen flow contents, etc.) and user interaction patterns (e.g., gestures, sensor data, finger pressure data, etc.). Once that data is collected, it may be sent to a server for processing. The server may receive that data from the client device. In some embodiments, the user interface data may be processed on the client device itself and not be sent to a server.

The interface configuration system may then use artificial intelligence (e.g., a machine learning model) to process the received data for neurodiversity characteristics. In particular, the interface configuration system may input the user interaction data into a machine learning model to obtain, based on the user interaction data, one or more neurodiversity categories associated with the user. The machine learning model may have been trained to identify categories of neurodiversity based on received user interaction data. For example, a training algorithm may have been used to train a machine learning model to detect neurodiversity categories within training datasets. A training dataset may have included training interaction data as a plurality of features with a target feature indicating a neurodiversity category. When the machine learning model is trained, the interface configuration system may receive user interaction data, and, based on that user interaction data, predict a category (or multiple categories) of neurodiversity associated with a corresponding user. The neurodiversity categories may include autistic spectrum disorders, dyspraxia, auditory processing disorder, Dyslexia Dyscalculia, Asperger syndrome, Hyperlexia, and others.

When the interface configuration system receives (e.g., from the machine learning model) one or more neurodiversity categories, the interface configuration system may start building a customized user interface for the one or more categories. In particular, the interface configuration system may retrieve, for each neurodiversity category of the one or more neurodiversity categories, a corresponding plurality of user interface parameters. Each corresponding plurality of user interface parameters may include one or more of text display parameters, text content parameters, color parameters, or navigation parameters. For example, each neurodiversity category may include a corresponding profile that stores user interface parameters for that neurodiversity category. The interface configuration system may retrieve each profile and access the user interface parameters.

The interface configuration system may then generate a customized user interface based on merging each corresponding plurality of user interface parameters into a set of user interface parameters for the application on the client device. For example, if there are multiple neurodiversity categories associated with the user, the interface configuration system may determine which user interface parameters match between those categories and adopt those matching user interface parameters for the customized user interface. For those user interface parameters that do not match, the interface configuration system may blend the values where appropriate or choose a parameter that is most appropriate. However, if there is a single neurodiversity category received from the machine learning model, the interface configuration system may use the user interface parameters from the corresponding profile in generating the customize user interface.

When the interface configuration system generates the customized user interface, the interface configuration system may cause the client device to prompt the user whether the user desired to use the customized user interface. In particular, the interface configuration system may transmit, to a client device, a request to change a current user interface with the customized user interface. The request may include the set of user interface parameters and a prompt requesting that the user accept or deny the request to change the current user interface. For example, a user may be able to input a response to the prompt whether to enable the customized user interface on the client device (e.g., replace the usual user interface with the customized user interface).

In some embodiments, the interface configuration system may train the machine learning model using a training dataset. The training dataset may include various features, such as features representing key stroke dynamics data, navigation pattern data, and/or interaction pattern data. The training dataset may include a target feature that indicates one or more neurodivergent categories for each entry (e.g., row) of feature values. The interface configuration system may train the machine learning model by inputting the training dataset into a training routine. When the machine learning model is trained, the machine learning model may be used to identify neurodivergent categories based on user interaction data.

In some embodiments, user interaction data may be collected from different devices and/or from different applications. This may be useful because larger data sets allow for better detection accuracy. For example, a user may have multiple devices (e.g., a smartphone, an electronic tablet, a laptop computer, etc.) where the user interacts with a particular application or multiple applications. Thus, the interface configuration system may collect user interaction data from multiple applications. In some embodiments, the user interface configuration system may prompt the user for permission to collect the data.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
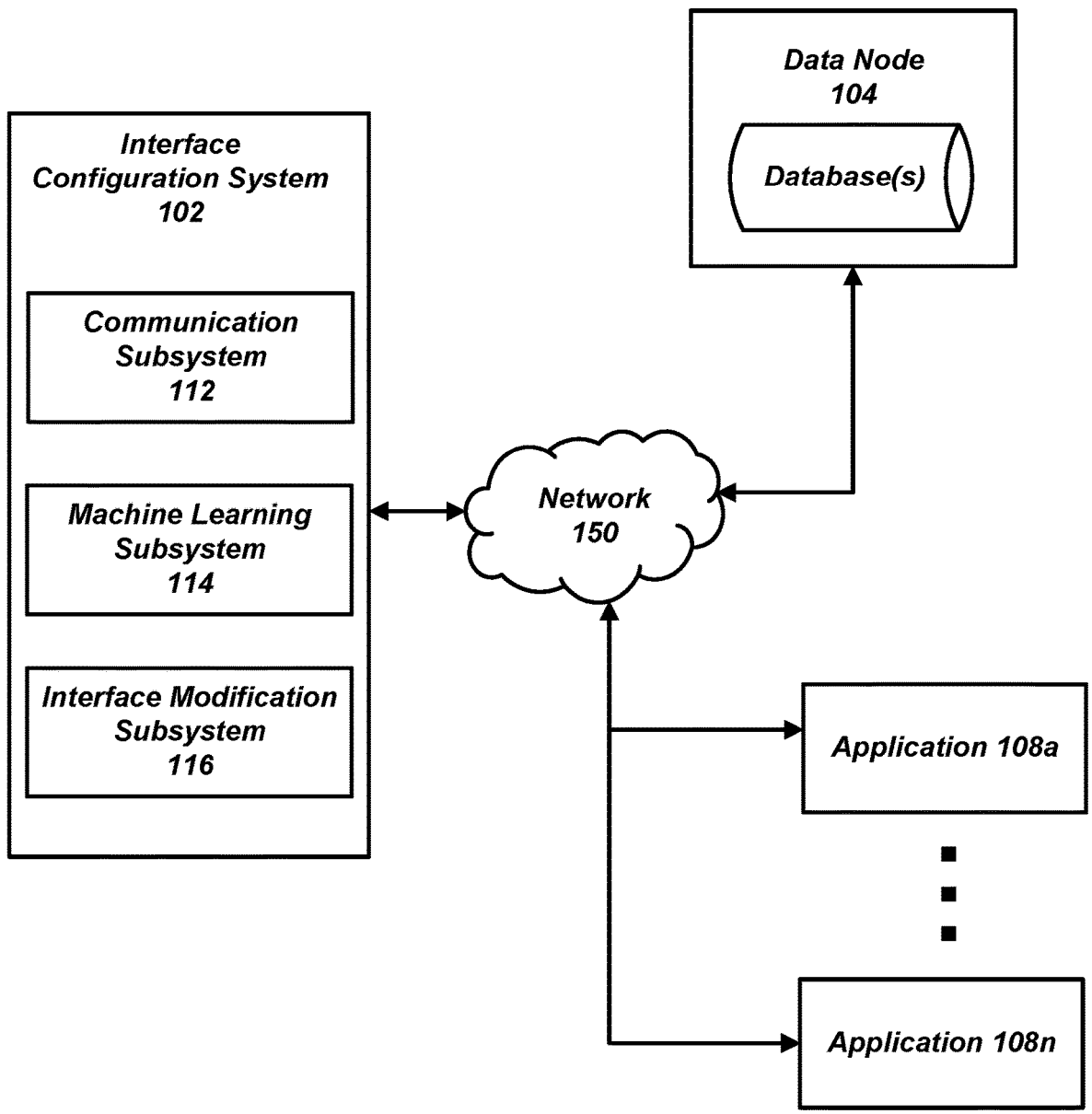
FIG. 1 shows an illustrative system for providing user interfaces using artificial intelligence, in accordance with one or more embodiments.

FIG. 1 is an example of environment 100 for providing user interfaces using artificial intelligence. Environment 100 may be hosted on a user computing device, on a server, or another suitable computing device. As referred to herein, the term "user interface" refers to the point of human-computer interaction and communication in a device. This may include display screens, audio output devices, and the appearance of a desktop. One example of a user interface is a graphical user interface enabling a computing device to display information to a user. Another example of a user interface is an audio interface enabling a user to hear information from a computing device.

Environment 100 includes interface configuration system 102, data node 104, and applications 108a-108n. Interface configuration system 102 may execute instructions for providing user interfaces using artificial intelligence. Interface configuration system 102 may include software, hardware, or a combination of the two. For example, interface configuration system 102 may reside on a physical server or a virtual server that is running on a physical computer system. In some embodiments, interface configuration system 102 may be configured on a user device (e.g., a laptop computer, a smartphone, a desktop computer, an electronic tablet, or another suitable user device).

Data node 104 may store various data, including one or more machine learning models, training data, user tokens, application tokens, and/or other suitable data. Data node 104 may include a combination of hardware (e.g., memory and/or disk) and software (e.g., for reading/writing data to the hardware). System bus may be a logical or a physical system bus connecting components of the system (e.g., interface configuration system 102, data node 104, and applications 108a-108n). Applications 108a-108n may be end-user applications residing, at least partially, on one or more client devices (e.g., desktop computers, laptops, electronic tablets, smartphones, and/or other computing devices used by end users).

Interface configuration system 102 may receive user interaction data associated with an application on a computing device of a user. For example, the user may be using an application on a smartphone, an electronic tablet, a computer, or another suitable computing device. An application on that computing device may log that data (e.g., as part of the application and/or as part of the operating system on that device). The client device may then transmit the interaction data to interface configuration system 102. In some embodiments, interface configuration system 102 may reside on the client/computing device. Thus, the client device may provide the interaction data to the interface configuration system locally.

The user interaction data may include one or more of key stroke dynamics data, navigation pattern data, or interaction pattern data. Key stroke dynamics may refer to a manner and rhythm in which an individual inputs characters on a keyboard, touch screen, keypad, or another input device. For example, key stroke dynamics data may include timing of key presses, key latency, dwell time, frequency, rhythm, and/or other data. Navigation pattern data may refer to time taken in screen navigation, interaction with different screen areas, and/or other data. User interaction pattern data may refer to use of various gestures, sensor finger/input device pressure, and/or other data.

Interface configuration system 102 may receive the interaction data via communication subsystem 112. Communication subsystem 112 may include software components, hardware components, or a combination of both. For example, communication subsystem 112 may include software that is enabled to communicate via a network card (e.g., using network 150). In some embodiments, communication subsystem 112 may receive the interaction data from an application of applications 108a-108n. Applications 108a-108n may be applications being hosted on a client device that includes user interface components (e.g., graphical user interface components, audio interface components, etc.). In some embodiments, applications 108a-108n may include an email application, a text editing application, a social media application, an image editing application, banking application, and/or other suitable applications. Communication subsystem 112 may pass the interaction data, or a pointer to the interaction data in memory, to machine learning subsystem 114. Machine learning subsystem 114 may include software components, hardware components, or a combination of both. For example, machine learning subsystem 114 may include software components (e.g., Application Programming Interface (API) calls) that access one or more machine learning models.

In some embodiments, machine learning subsystem 114 may retrieve additional user interaction data. For example, communication subsystem 112 may receive user interaction data as a user is using a computing device to access a particular application (e.g., a banking application). Machine learning subsystem 114 may receive that data and also receive an identifier associated with the user. Based on the user identifier, machine learning subsystem 114 may retrieve additional interaction data (e.g., retrieved from other devices with which the user interacted). In particular, machine learning subsystem 114 may, in response to receiving the user interaction data, retrieve additional user interaction data associated with one or more applications associated with the user, for example, when a user may be interacting with an application (e.g., a banking application on different user devices, such as on a smartphone, on an electronic tablet, on a laptop computer, and/or other user devices). As the user is interacting with the application on those devices, the application may collect user interaction data and store that data in a database (e.g., on data node 104) in association with the user's identifier. Thus, machine learning subsystem 114 may retrieve the additional data using the user identifier.

When the additional user interaction data is retrieved, machine learning subsystem 114 may modify the user interaction data with the additional user interaction data. As discussed above, the additional user interaction data may include key stroke dynamics data, navigation pattern data, and interaction pattern data collected from different user devices. That data may be in different formats depending on the type of user device. For example, a smartphone with a touch screen may include different formats of data than a laptop computer having a keyboard. Accordingly, the additional user interaction data may be adjusted to match the user interaction data. One adjustment may include removing certain additional user interaction data. For example, the user may be interacting with the application using a keyboard on a laptop computer. However, some interaction data may have been received from a touch screen device. Accordingly, machine learning subsystem 114 may normalize the additional interaction data by, for example, removing certain touch screen data that is irrelevant to the scenario (e.g., removing the data related to screen press strength). In some embodiments, machine learning subsystem 114 may normalize the additional user interaction data for use on the type of device with which the user is interacting. Normalizing may include updating values within the additional user interaction data for use within the user interaction data. For example, if a certain device has a particular font size because that device is small (e.g., smartphone), the machine learning model may adjust the font size value to be in line for a laptop computer.

Figure 2:
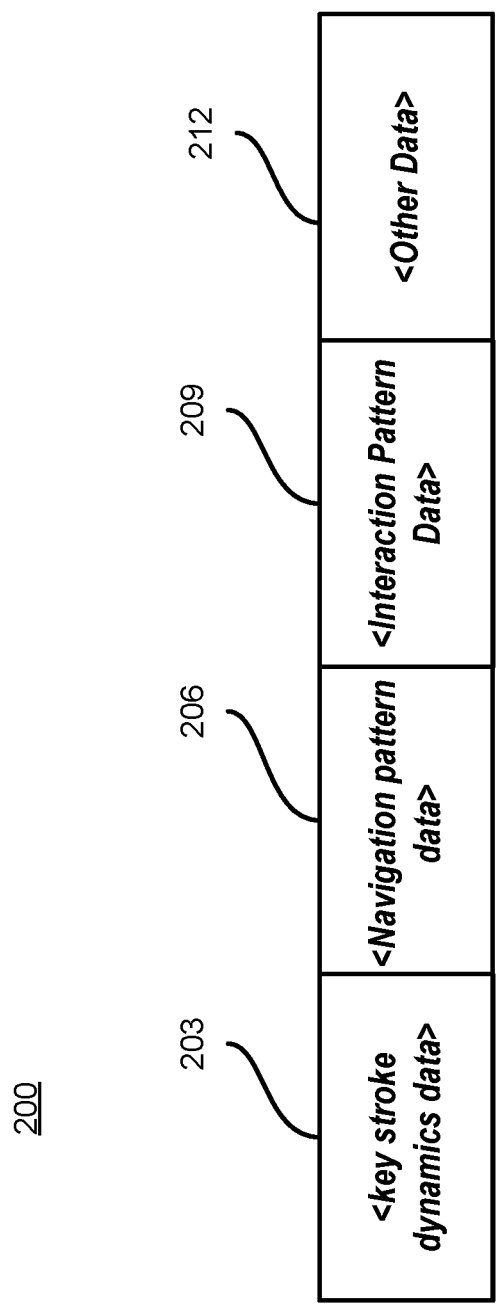
FIG. 2 illustrates an input vector for use by a machine learning model, in accordance with one or more embodiments.

In some embodiments, when the interaction data is received, machine learning subsystem 114 may prepare the received data for input into a machine learning model for obtaining one or more neurodiversity categories associated with the user. In particular, machine learning subsystem 114 may generate an input vector for the machine learning model. The input vector may include corresponding key stroke dynamics data, corresponding navigation pattern data, and corresponding interaction pattern data. FIG. 2 illustrates input vector 200 for use by a machine learning model. The machine learning model may be a neural network or another suitable machine learning model. Input vector 200 may include field 203 that may store key stroke dynamics data, field 206 that may store navigation pattern data, and field 209 that may store pattern data. In some embodiments, input vector 200 may include one or more other fields (e.g., field 212) that may store various interaction data.

Machine learning subsystem 114 may then generate an embedding for the machine learning model using the input vector. For example, machine learning subsystem 114 may use an embedding model to generate the embedding. The embedding model itself may be another machine learning model that generates embedding in a vector space of the embedding model. In some embodiments, machine learning subsystem 114 may refrain from generating the embedding and just use the input vector itself as input to a machine learning model that predicts one or more neurodiversity categories for the user based on the interaction data.

Machine learning subsystem 114 may then determine one or more neurodiversity categories for the user using a machine learning model. In particular, machine learning subsystem 114 may input the user interaction data into a machine learning model to obtain, based on the user interaction data, one or more neurodiversity categories associated with the user. The machine learning model may be trained to identify categories of neurodiversity based on received user interaction data. For example, the machine learning model may be hosted on data node 104. Thus, machine learning subsystem 114 may perform the input operation over network 150 (e.g., via an API). In some embodiments, the machine learning model may be hosted on the same device as machine learning subsystem 114. Accordingly, machine learning subsystem 114 may perform the input operation locally.

Figure 3:
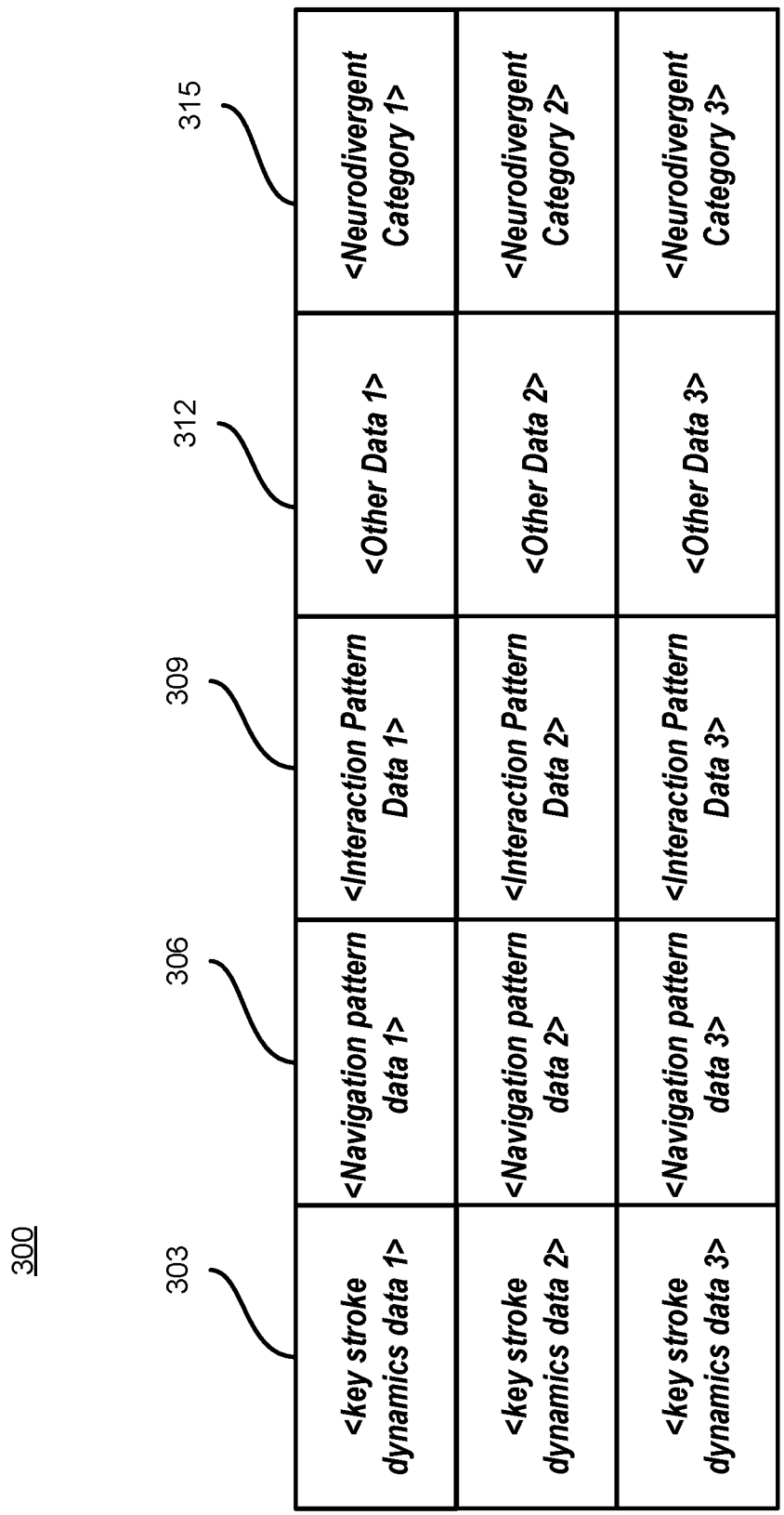
FIG. 3 illustrates an excerpt from a training dataset, in accordance with one or more embodiments.

In some embodiments, the machine learning model may be trained using a training dataset. For example, the training may be supervised training using labeled data. In particular, machine learning subsystem 114 may receive a training dataset that includes a plurality of features. The plurality of features may include captured key stroke dynamics data, captured navigation pattern data, and captured interaction pattern data for a plurality of users. Furthermore, the training dataset may include a target feature indicating one or more neurodivergent categories. For example, FIG. 3 illustrates an excerpt from a training dataset 300. FIG. 3 includes feature 303 corresponding to key stroke dynamics data, feature 306 corresponding to navigation pattern data, and feature 309 corresponding to interaction pattern data. In some embodiments, training dataset 300 may include feature 312 with various other data. Feature 315 may be a target feature or otherwise known as label data. Feature 315 may correspond to one or more neurodiversity categories associated with each user. Accordingly, each row may represent a different user.

In some embodiments, each feature may be an embedding associated with corresponding data. For example, machine learning subsystem 114 may generate a plurality of embedding based on the captured key stroke dynamics data, the captured navigation pattern data, and the captured interaction pattern data. As discussed above, in some embodiments, the embeddings may be generated using an embedding model (e.g., another machine learning model).

Machine learning subsystem 114 may then input the training dataset into a training routine of the machine learning model to train the machine learning model to identify the one or more neurodivergent categories based on input data. As discussed above, the input data may include one or more of the key stroke dynamics data, the navigation pattern data, or the interaction pattern data. The training routine may train the machine learning model based on the input data. This may correspond to supervised training. In some embodiments, the machine learning model may be trained using unsupervised training.

Figure 4:
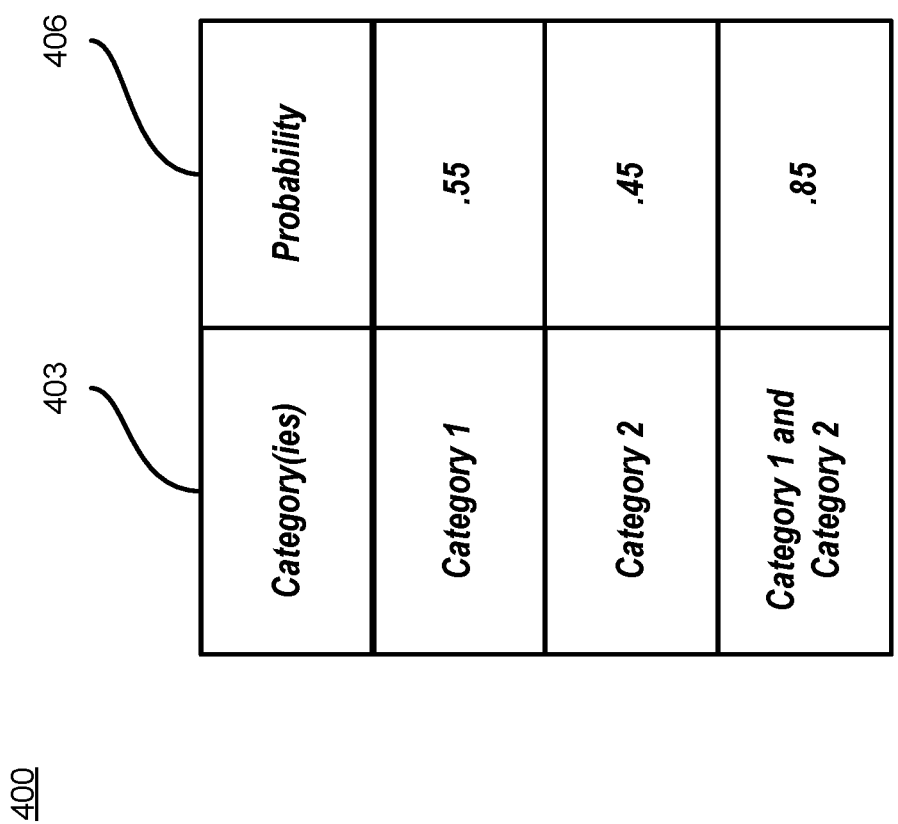
FIG. 4 illustrates a data structure that may be output by the machine learning model, in accordance with one or more embodiments.

The machine learning model may output one or more neurodiversity categories for the user. FIG. 4 illustrates a data structure 400 that may be output by the machine learning model. Data structure 400 may include field 403 that may store one or more neurodiversity categories, while field 406 may store probabilities for each category or categories. In some embodiments, the machine learning model may output only the highest probability result without outputting the probability itself. However, in some embodiments, the machine learning model may output multiple probabilities (e.g., all probabilities above 40 percent). Thus, machine learning subsystem 114 may select the entry within the highest probability.

Figure 5:
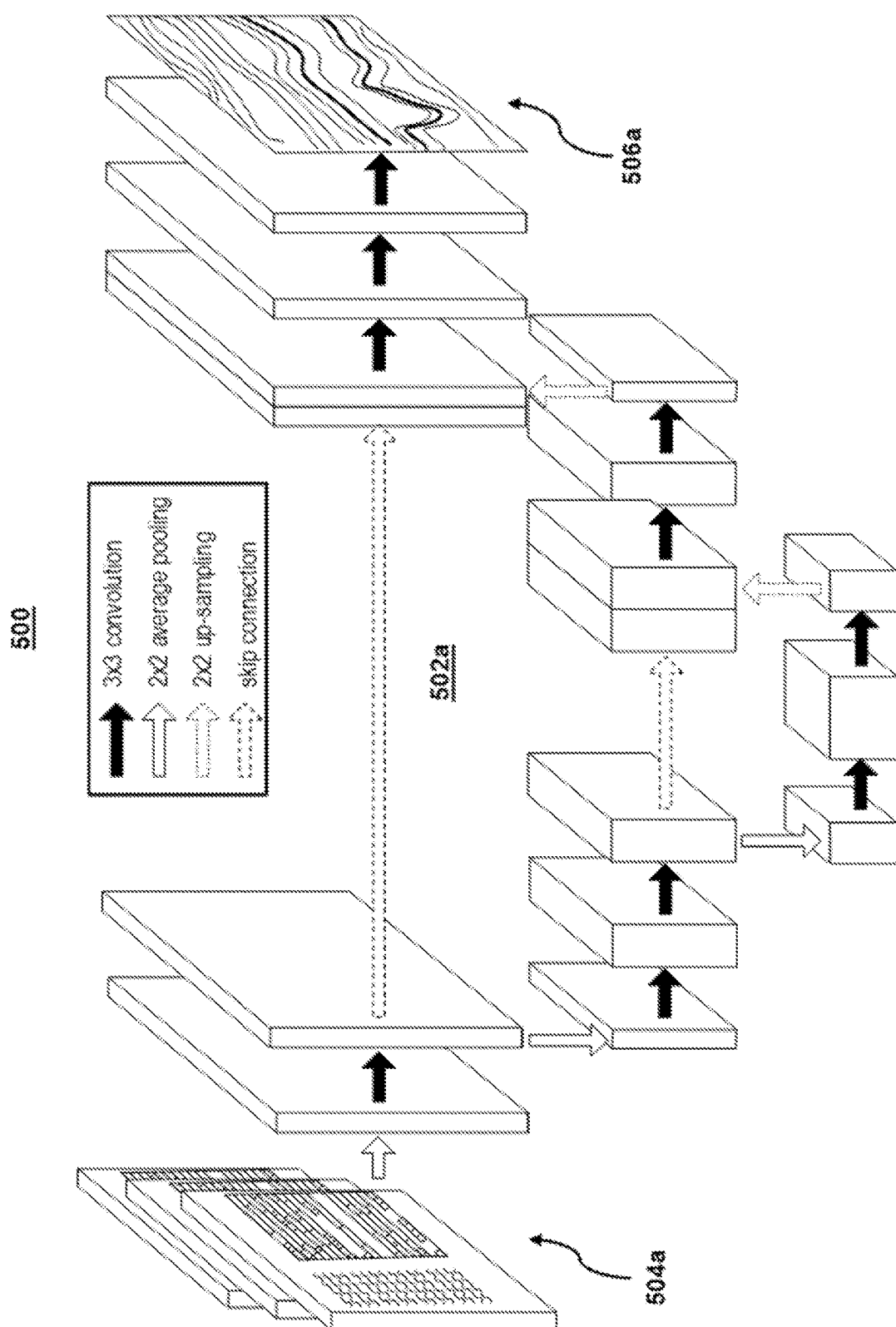
FIG. 5 shows illustrative components for a machine learning model used for providing user interfaces using artificial intelligence, in accordance with one or more embodiments.

FIG. 5 shows illustrative components for a system used for providing user interfaces using artificial intelligence, in accordance with one or more embodiments. System 500 includes model 502a, which may be a machine learning model, artificial intelligence model, etc. (which may be referred to collectively as "models" herein). Model 502a may take inputs 504a (e.g., vector of FIG. 2 or an embedding associated with the data) and provide outputs 506a (e.g., data structure of FIG. 4). The inputs may include multiple datasets, such as a training dataset and a test dataset. Each of the plurality of datasets (e.g., inputs 504a) may include data subsets related to user data, predicted forecasts and/or errors, and/or actual forecasts and/or errors. In some embodiments, outputs 506a may be fed back to model 502a as input to train model 502a (e.g., alone or in conjunction with user indications of the accuracy of outputs 506a, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction.

In a variety of embodiments, model 502a may update its configurations (e.g., weights, biases, or other parameters) based on the assessment of its prediction (e.g., outputs 506a) and reference feedback information (e.g., user indication of accuracy, reference labels, or other information). In a variety of embodiments, where model 502a is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 502a may be trained to generate better predictions. In some embodiments, the model (e.g., model 502a) may automatically perform actions based on outputs 506a. In some embodiments, the model (e.g., model 502a) may not perform any actions. The output of the model (e.g., model 502a) may be used to perform actions described below.

When machine learning subsystem 114 determines (e.g., via the machine learning model) one or more neurodivergent categories for the user, machine learning subsystem 114 may begin generating a customized user interface for that user. In particular, machine learning subsystem 114 may retrieve, for a first neurodiversity category of the one or more neurodiversity categories, a plurality of user interface parameters. In some embodiments, the retrieval operation may include retrieving one or more of text display parameters, text content parameters, color parameters, or navigation parameters. For example, data node 104 may include a database that may store user interface parameters for different neurodiversity categories. Those parameters may include text display parameters as users of some neurodiversity categories may prefer or require text of a certain size, certain color, and/or certain font. In another example, the text content parameters may correspond to a certain way paragraphs are organized and displayed on the screen. In yet another example, users of one or more neurodiversity categories may prefer/require certain background/foreground colors for better user experience. Navigation parameters may also be modified to help users within certain neurodiversity categories, for example, by having navigation controls more visible or more pronounced when they are displayed. To continue with the example above, machine learning subsystem may query the database (e.g., on data node 104) and retrieve the user interface parameters for the particular neurodiversity category from the database. In some embodiments, the database may reside on the same device as interface configuration system 102.

In some embodiments, machine learning subsystem 114 may receive more than one neurodiversity category from the machine learning model. In those instances, machine learning subsystem 114 may retrieve, for each neurodiversity category of the one or more neurodiversity categories, a corresponding plurality of user interface parameters. As discussed above, each corresponding plurality of user interface parameters may include one or more of text display parameters, text content parameters, color parameters, or navigation parameters. For example, machine learning subsystem 114 may query a database (e.g., on data node 104) for multiple sets of user interface parameters such that each set of user interface parameters corresponds to one of the neurodiversity categories predicted by the machine learning model.

When machine learning subsystem 114 receives the user interface parameters, machine learning subsystem 114 may pass those user interface parameters to interface modification subsystem 116. Interface modification subsystem 116 may include software components, hardware components, or a combination of both. For example, interface modification subsystem 116 may include software components (e.g., API calls) that interact with applications and/or user devices to modify user interfaces on those devices. In some embodiments, interface modification subsystem 116 may reside on a server device and transmit user interface modification commands to user devices. However, in some embodiments, interface modification subsystem 116 may reside on a client device and perform interface modifications directly on that device. In yet some embodiments, one or more portions of interface modification subsystem 116 may reside on a server device and one or more portions may reside on the client device.

Interface modification subsystem 116 may then generate a customized user interface for the user based on user interface parameters. For example, interface modification subsystem 116 may generate a customized user interface based on merging the plurality of user interface parameters into a set of user interface parameters for the application. The customized user interface may include instructions for updating a user interface. For example, the instructions may include instructions to customize application text (e.g., font size, font type, etc.), background colors, foreground graphics, navigation icons (e.g., buttons), and or other suitable instructions. The instructions may include updates to the current user interface parameters. For example, if a font size is currently lower than the font size indicated within the user interface parameters, interface modification subsystem 116 may update the font size.

In some embodiments, where multiple neurodiversity categories were identified for the user by the machine learning model, interface modification subsystem 116 may generate a customized interface based on all of the identified neurodiversity categories. In some embodiments, a database (e.g., on data node 104) may store an entry for user interface parameters for a combination of categories. Thus, interface configuration system 102 may retrieve parameter values already determined for the combination. However, in some embodiments, the database may not store user interface parameters for a combination of categories. Thus, interface configuration system 102 may generate a customized user interface based on merging each corresponding plurality of user interface parameters into a set of user interface parameters for the application on the client device. For example, if two neurodiverse categories indicate a different size font to select, interface modification subsystem 116 may select the largest font size of the two.

In some embodiments, interface modification subsystem 116 may perform the following operations when generating the customized user interface. Interface modification subsystem 116 may receive interface data associated with the current user interface. For example, a portion of interface modification subsystem 116 may request current user interface parameters for the current interface. The parameters may be ones that are modifiable. In some embodiments, interface modification subsystem 116 may receive an image of the current user interface or programming instructions associated with generating the current user interface.

Interface modification subsystem 116 may instruct machine learning subsystem 114 to input the interface data and the set of user interface parameters into an interface generation model to obtain updated interface data. The interface generation model may be trained to generate the updated interface data. For example, the interface generation model may be a machine learning model described in relation to FIG. 5. Thus, the interface generation model may output updated user interface data. When the updated user interface data is received, interface modification subsystem 116 may generate the customized user interface based on the updated interface data. The customized user interface may be instructions for the client device to modify or generate a current user interface.

In some embodiments, interface modification subsystem 116 may account for a device type with which the user is interacting when generating the customized user interface. That is, interface modification subsystem 116 may determine a device type with which the user is interacting and modify the customized user interface based on the device type. For example, as discussed above, machine learning subsystem 114 may input the device type into the interface generation model and the output may be consistent with the device type. In some embodiments, the different user interface parameters may be organized by device type with a database (e.g., a database on data node 104). Accordingly, interface modification subsystem 116 may select the customized user interface consistent with the device type.

In some embodiments, interface modification subsystem 116 may perform the following operations when generating the customized user interface. Interface modification subsystem 116 may determine modifiable user interface parameters of the current user interface. For example, interface modification subsystem 116 may query the application (e.g., via an application programming interface) to provide modifiable user interface parameters. In response, the application may send to the interface modification subsystem 116 those parameters that are modifiable. For example, interface modification subsystem 116 may receive parameters such as text size, text color, background color, foreground color, navigation icons, etc. In some embodiments, the list of modifiable user interface parameters and their current values may be stored in a configuration file or a configuration location which may be read by the application. Thus, interface modification subsystem 116 may retrieve those modifiable user interface parameters.

When the modifiable user interface parameters are retrieved, they may be used to generate the customized user interface by, for example, modifying the values of those user interface parameters. In particular, interface modification subsystem 116 may generate the set of user interface parameters based on the modifiable user interface parameters. Those user interface parameters may be stored in a file or another suitable data structure. In some embodiments, those parameters may be transmitted to a database (e.g., on data node 104) and may be stored in associated with the user identifier of the user, so that those user interface parameters may be retrieved for later use.

When the customized user interface is generated (e.g., via user interface parameters), interface modification subsystem 116 may generate a request to change a current user interface with the customized user interface. In some embodiments, the request may include the user interface parameters. In particular, interface modification subsystem 116 may add the set of user interface parameters to the request. In some embodiments, the request may be executed locally (e.g., when at least a portion of interface modification subsystem 116 resides on the client device). Thus, interface modification subsystem 116 may pass the request to the operating system of the client device or to the application itself for use in modifying the current user interface.

In some embodiments, the operations may be performed on a server device and the request may be sent to a client device of the user. Thus, interface modification subsystem 116 may transmit (e.g., using communication subsystem 112) the request to a client device. The request may cause the client device to apply the set of user interface parameters to the current user interface. For example, modifiable user interface parameters may be replaced in a configuration file or another configuration data structure with the user interface parameters for the customized user interface. The application may detect the changes and update the user interface being displayed for the user. In some embodiments, those changes may be performed through an application programming interface associated with the operating system of the client device and/or application programming interface of the application.

In some embodiments, interface configuration system 102 may give a user a chance to accept or reject the updated user interface. Thus, interface modification subsystem 116 may include in the request a prompt requesting that the user accept or deny the request to change the current user interface. Based on the user accepting or denying the request, interface modification subsystem 116 may instruct the client device and/or the application to apply the customized interface. Thus, in some embodiments, interface modification subsystem 116 may transmit, to the client device, a request to change a current user interface with the customized user interface. The request may include the set of user interface parameters and a prompt requesting that the user accept or deny the request to change the current user interface. The client device and/or the application on the client device may prompt the user to approve or deny the request and, based on the response, apply the customized user interface or refrain from applying the customized user interface.

Figure 6:
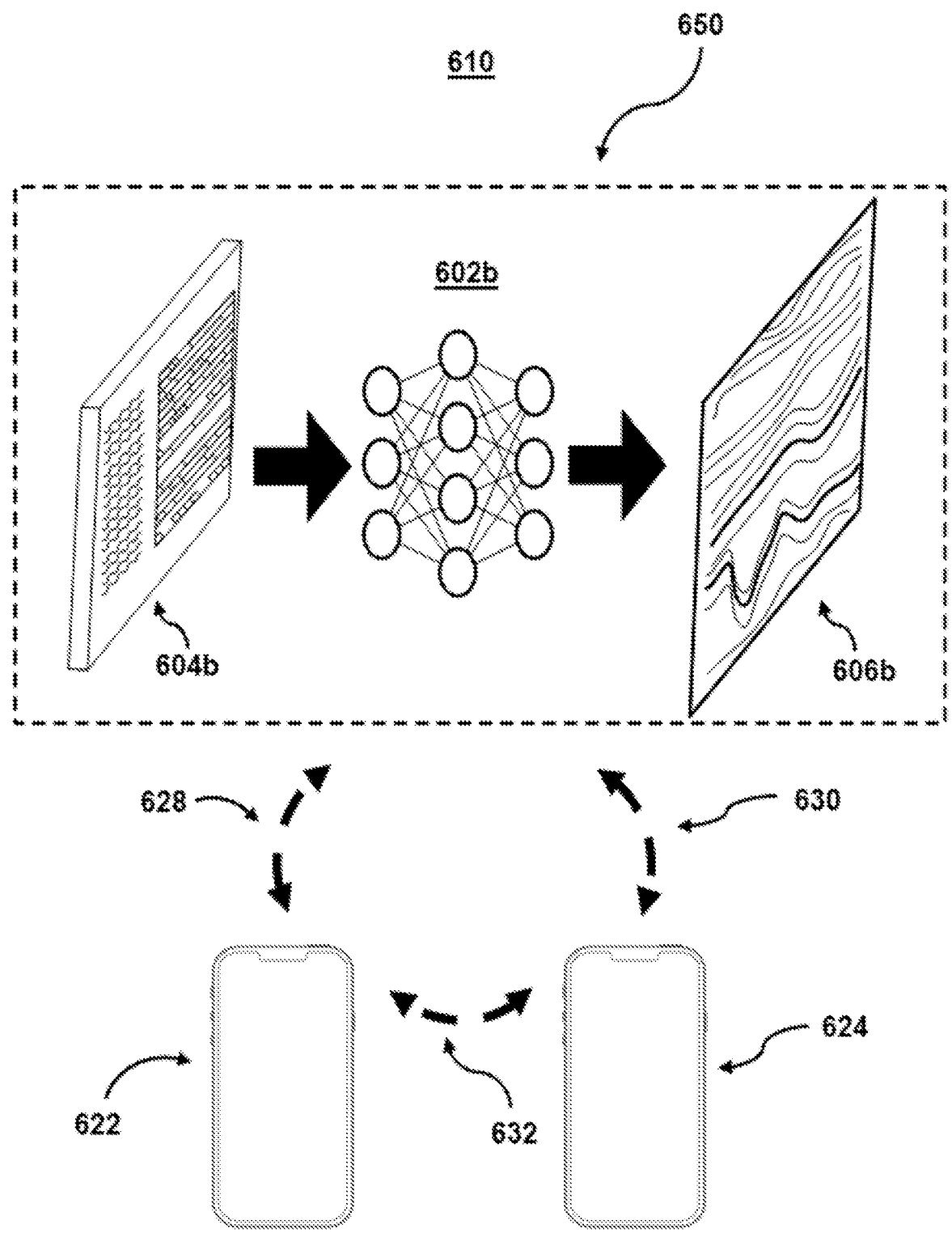
FIG. 6 shows illustrative components for a system used for providing user interfaces using artificial intelligence, in accordance with one or more embodiments.

FIG. 6 illustrates a portion of the environment that may be used in accordance with this disclosure. As shown in FIG. 6, the system may include mobile device 622 and mobile device 624. While shown as smartphones in FIG. 6, it should be noted that mobile device 622 and mobile device 624 may be any computing device, including, but not limited to, a laptop computer, a tablet computer, a handheld computer, and other computer equipment (e.g., a server), including "smart," wireless, wearable, and/or mobile devices. System 610 may also include cloud components. For example, cloud components may be implemented as a cloud computing system and may feature one or more component devices. It should be noted that, while one or more operations are described herein as being performed by particular components of system 610, these operations may, in some embodiments, be performed by other components of system 610. As an example, while one or more operations are described herein as being performed by components of mobile device 622, these operations may, in some embodiments, be performed by cloud components. In some embodiments, the various computers and systems described herein may include one or more computing devices that are programmed to perform the described functions. Additionally, or alternatively, multiple users may interact with system 610 and/or one or more components of system 610.

With respect to the components of mobile device 622 and mobile device 624, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 6, both mobile device 622 and mobile device 624 include a display upon which to display data.

Additionally, as mobile device 622 and mobile device 624 are shown as touchscreen smartphones, these displays also act as user input interfaces. It should be noted that in some embodiments, the devices may have neither user input interfaces nor displays and may instead receive and display content using another device (e.g., a dedicated display device such as a computer screen and/or a dedicated input device such as a remote control, mouse, voice input, etc.). Additionally, the devices in system 610 may run an application (or another suitable program).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, Random Access Memory (RAM), etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 6 also includes communication paths 628, 630, and 632. Communication paths 628, 630, and 632 may include the internet, a mobile phone network, a mobile voice or data network (e.g., a 5G or LTE network), a cable network, a public switched telephone network, or other types of communications networks or combinations of communications networks. Communication paths 628, 630, and 632 may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

System 610 also includes API layer 650. API layer 650 may allow the system to synchronize data across different devices. In some embodiments, API layer 650 may be implemented on mobile device 622 or mobile device 624. Alternatively, or additionally, API layer 650 may reside on one or more of cloud components of system 610. API layer 650 (which may be a REST or Web services API layer) may provide a decoupled interface to data and/or functionality of one or more applications. API layer 650 may provide a common, language-agnostic way of interacting with an application. Web services APIs offer a well-defined contract called WSDL that describes the services in terms of its operations and the data types used to exchange information. REST APIs do not typically have this contract; instead, they are documented with client libraries for most common languages, including Ruby, Java, PHP, and JavaScript. SOAP web services have traditionally been adopted in the enterprise for publishing internal services, as well as for exchanging information with partners in B2B transactions.

API layer 650 may use various architectural arrangements. For example, system 610 may be partially based on API layer 650, such that there is strong adoption of SOAP and RESTful web services, using resources like Service Repository and Developer Portal, but with low governance, standardization, and separation of concerns. Alternatively, system 610 may be fully based on API layer 650, such that separation of concerns between layers like API layer 650, services, and applications are in place In some embodiments, the system architecture may use a microservice approach. Such systems may use two types of layers: Front-End Layer and Back-End Layer where microservices reside. In this kind of architecture, the role of the API layer 650 may provide integration between Front-End and Back-End. In such cases, API layer 650 may use RESTful APIs (exposition to front-end or even communication between microservices). API layer 650 may use AMQP (e.g., Kafka, RabbitMQ, etc.). API layer 650 may use incipient usage of new communications protocols such as gRPC, Thrift, etc.

In some embodiments, the system architecture may use an open API approach. In such cases, API layer 650 may use commercial or open-source API platforms and their modules. API layer 650 may use a developer portal. API layer 650 may use strong security constraints applying WAF and DDOS protection, and API layer 650 may use RESTful APIs as standard for external integration.

As shown in FIG. 6, in some embodiments, model 602b may be trained by taking inputs 604b and providing outputs 606b. Model 602b may include an artificial neural network. In such embodiments, model 602b may include an input layer and one or more hidden layers. Each neural unit of model 602b may be connected with many other neural units of model 602b. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 602b may be self-learning and trained, rather than explicitly programmed, and can perform significantly better in certain areas of problem solving as compared to traditional computer programs. During training, an output layer of model 602b may correspond to a classification of model 602b, and an input known to correspond to that classification may be input into an input layer of model 602b during training. During testing, an input without a known classification may be input into the input layer, and a determined classification may be output.

In some embodiments, model 602b may include multiple layers (e.g., where a signal path traverses from front layers to back layers). In some embodiments, back propagation techniques may be utilized by model 602b where forward stimulation is used to reset weights on the "front" neural units. In some embodiments, stimulation and inhibition for model 602 may be more free-flowing, with connections interacting in a more chaotic and complex fashion. During testing, an output layer of model 602b may indicate whether or not a given input corresponds to a classification of model 602b.

Model 602b is shown as a convolutional neural network. A convolutional neural network consists of an input layer (e.g., input 604b), hidden layers, and an output layer (e.g., output 606b). As shown in FIG. 6, the middle layers are called hidden because their inputs and outputs are masked by the activation function and final convolution. In a convolutional neural network, the hidden layers include layers that perform convolutions. Model 602b may comprise convolutional layers that convolve the input and pass its result to the next layer. Model 602b includes local and/or global pooling layers along with traditional convolutional layers. Pooling layers reduce the dimensions of data by combining the outputs of neuron clusters at one layer into a single neuron in the next layer. Also as shown, model 602b may comprise fully connected layers that connect every neuron in one layer to every neuron in another layer.

Figure 7:
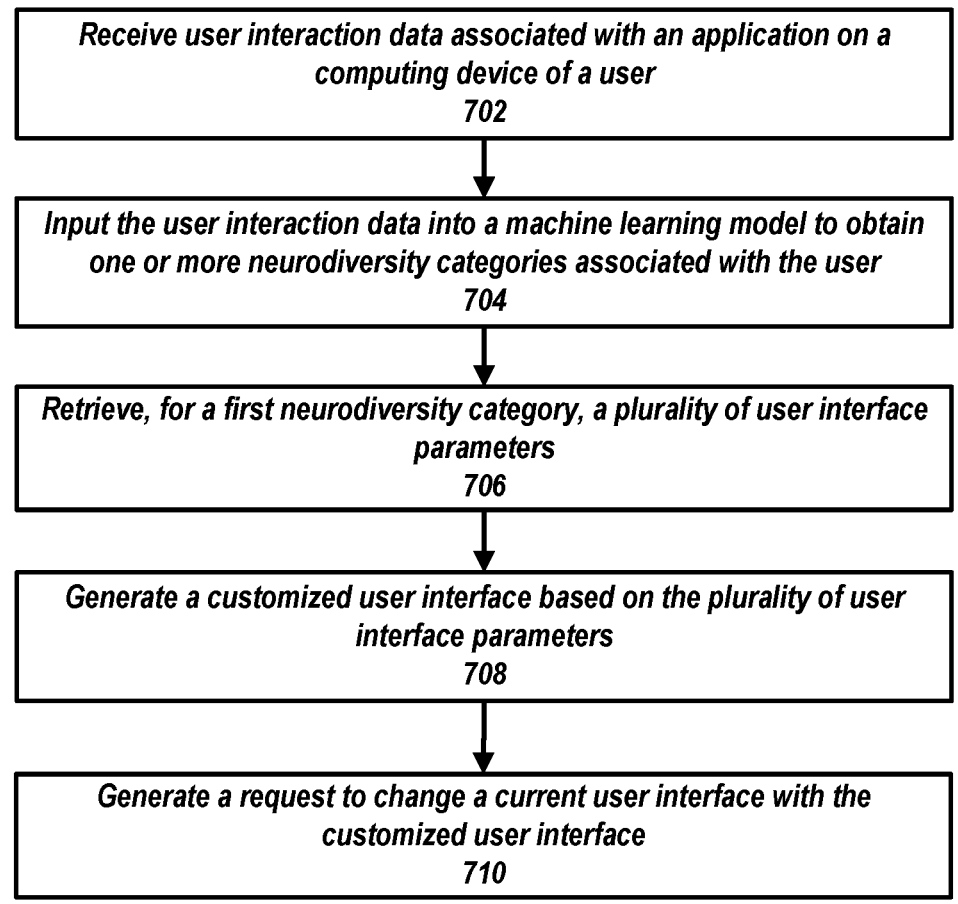
FIG. 7 shows a flowchart of the steps for providing user interfaces using artificial intelligence, in accordance with one or more embodiments.

FIG. 7 shows a flowchart of the steps for providing user interfaces using artificial intelligence. For example, the system may use process 700 (e.g., as implemented on one or more system components described above (e.g., in FIGS. 1 and 6)) in order to provide user interfaces using artificial intelligence. The operations described above may be performed on a user device (e.g., mobile device 622 or mobile device 624), in a cloud system, or using a combination of both. Thus, some operations may be performed on a user device and some operations may be performed in the cloud. Mobile device 622 and/or mobile device 624 may be user devices associated with users (e.g., smartphones, electronic tablets, etc.).

At 702, interface configuration system 102 receives user interaction data associated with an application on a computing device of a user. For example, interface configuration system 102 may receive the user interaction data from mobile device 622, mobile device 624, or from one of cloud components of system 610. When the user interaction data is received from a user device, the user interaction data may be processed locally. However, when the request is received from one of cloud components of system 610, the user interaction data may be processed in the cloud. In some embodiments, the user interaction data may be processed by the combination of cloud components of system 610 and a mobile device 622 or mobile device 624. In some embodiments, interface configuration system 102 may use one or more processors of one of the cloud components or a client device to perform this operation.

At 704, interface configuration system 102 inputs the user interaction data into a machine learning model to obtain one or more neurodiversity categories associated with the user. For example, interface configuration system 102 may perform the input operation on mobile device 622, mobile device 624, or on one of cloud components of system 610. For example, interface configuration system 102 may reside on a user device and may perform the input operation on the user device. Interface configuration system 102 may perform the input operation on one of cloud components 610, for example, when the machine learning model resides in the cloud. In some embodiments, interface configuration system 102 may use an API call to the machine learning model in the cloud as part of this operation.

In some embodiments, interface configuration system 102 may use one or more processors of one of the cloud components or a client device to perform this operation.

At 706, interface configuration system 102 retrieves, for a first neurodiversity category, a plurality of user interface parameters. For example, interface configuration system 102 may perform the retrieval operation on mobile device 622, mobile device 624, or on one of cloud components of system 610. For example, interface configuration system 102 may reside on a user device and may perform the retrieval operation from cloud components of system 610 via a client device. In another example, interface configuration system 102 may reside on one of cloud components of system 610 and may perform the retrieval operation within the cloud. In some embodiments, interface configuration system 102 may use one or more processors of one of the cloud components or a client device to perform this operation.

At 708, interface configuration system 102 generates a customized user interface based on the plurality of user interface parameters. In some embodiments, interface configuration system 102 may use one or more processors of one of the cloud components or a client device to perform this operation. Interface configuration system 102 may store the results in one or more memories.

At 710, interface configuration system 102 generates a request to change a current user interface with the customized user interface. For example, interface configuration system 102 may generate and send the request locally on mobile device 622, mobile device 624, or from one of cloud components of system 610. For example, interface configuration system 102 may reside on a user device and may generate and send the request through a system bus or another suitable interface. Interface configuration system 102 may generate and send the request to one of cloud components of system 610, for example, when the machine learning model resides in the cloud. In some embodiments, interface configuration system 102 may use one or more processors of one of the cloud components or a client device to perform this operation. Interface configuration system 102 may store the results in one or more memories.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

The above-described embodiments of the present disclosure are presented for purposes of illustration and not of limitation, and the present disclosure is limited only by the claims that follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: receiving user interaction data associated with an application on a computing device of a user, wherein the user interaction data comprises one or more of key stroke dynamics data, navigation pattern data, or interaction pattern data; inputting the user interaction data into a machine learning model to obtain, based on the user interaction data, one or more neurodiversity categories associated with the user, wherein the machine learning model is trained to identify categories of neurodiversity based on received user interaction data; retrieving, for a first neurodiversity category of the one or more neurodiversity categories, a plurality of user interface parameters; generating a customized user interface based on merging the plurality of user interface parameters into a set of user interface parameters for the application; and generating a request to change a current user interface with the customized user interface.

2. The method of any one of the preceding embodiments, further comprising: adding the set of user interface parameters to the request; and transmitting the request to a client device, wherein the request causes the client device to apply the set of user interface parameters to the current user interface.

3. The method of any one of the preceding embodiments, wherein generating the customized user interface based on merging the plurality of user interface parameters into the set of user interface parameters comprises: receiving interface data associated with the current user interface;

inputting the interface data and the set of user interface parameters into an interface generation model to obtain updated interface data, wherein the interface generation model is trained to generate the updated interface data; and generating the customized user interface based on the updated interface data.

4. The method of any one of the preceding embodiments, further comprising: generating an input vector for the machine learning model, wherein the input vector comprises corresponding key stroke dynamics data, corresponding navigation pattern data, and corresponding interaction pattern data; and generating an embedding for the machine learning model using the input vector.

5. The method of any one of the preceding embodiments, wherein retrieving the plurality of user interface parameters comprises retrieving one or more of text display parameters, text content parameters, color parameters, or navigation parameters.

6. The method of any one of the preceding embodiments, wherein the request comprises a prompt requesting that the user accept or deny the request to change the current user interface.

7. The method of any one of the preceding embodiments, further comprising: receiving a training dataset comprising a plurality of features, wherein the plurality of features comprises captured key stroke dynamics data, captured navigation pattern data, and captured interaction pattern data for a plurality of users, and wherein the training dataset comprises a target feature indicating one or more neurodivergent categories; and inputting the training dataset into a training routine of the machine learning model to train the machine learning model to identify the one or more neurodivergent categories based on input data comprising one or more of the key stroke dynamics data, the navigation pattern data, or the interaction pattern data.

8. The method of any one of the preceding embodiments, further comprising: generating a plurality of embedding based on the captured key stroke dynamics data, the captured navigation pattern data, and the captured interaction pattern data.
9. The method of any one of the preceding embodiments, further comprising: determining a device type with which the user is interacting; and modifying the customized user interface based on the device type.
10. The method of any one of the preceding embodiments, further comprising: in response to receiving the user interaction data, retrieving additional user interaction data associated with one or more applications associated with the user; and modifying the user interaction data with the additional user interaction data.
11. The method of any one of the preceding embodiments, wherein generating the customized user interface comprises: determining modifiable user interface parameters of the current user interface; and generating the set of user interface parameters based on the modifiable user interface parameters.
12. A tangible, non-transitory, computer-readable medium storing instructions that, when executed by a data processing apparatus, cause the data processing apparatus to perform operations comprising those of any of embodiments 1-11.
13. A system comprising one or more processors; and memory storing instructions that, when executed by the processors, cause the processors to effectuate operations comprising those of any of embodiments 1-11.
14. A system comprising means for performing any of embodiments 1-11.

What is claimed is:

1. A system for providing user interfaces using artificial intelligence, the system comprising:
one or more processors; and
one or more memories configured to store instructions that, when executed by the one or more processors, perform operations comprising:
receiving, at a server, user interaction data as a user interacts with a first application on a client device, wherein the user interaction data comprises one or more of key stroke dynamics data, navigation pattern data, or interaction pattern data;
inputting the user interaction data into a machine learning model to obtain, based on the user interaction data, a plurality of neurodiversity categories associated with the user, wherein the machine learning model is trained, using previously collected user interaction data to identify categories of neurodiversity within the previously collected user interaction data;
retrieving, for each neurodiversity category of the plurality of neurodiversity categories, a corresponding plurality of user interface parameters, wherein each corresponding plurality of user interface parameters comprises one or more of text display parameters, text content parameters, color parameters, or navigation parameters;
generating a first set of user interface parameters comprising user interface parameters that are identical for each neurodiversity category of the plurality of neurodiversity categories;
merging non-matching user interface parameters into a second set of user interface parameters, wherein the non-matching user interface parameters are different for one or more neurodiversity categories of the plurality of neurodiversity categories obtained from the machine learning model;
generating a set of user interface parameters based on the first set of user interface parameters and the second set of user interface parameters associated with the plurality of neurodiversity categories;
generating a customized user interface based on the set of user interface parameters for the first application on the client device; and
transmitting, to the client device, a request to change a current user interface with the customized user interface, wherein the request comprises the set of user interface parameters and a prompt requesting that the user accept or deny the request to change the current user interface.

2. A method for providing user interfaces using artificial intelligence, the method comprising:
receiving user interaction data associated with a first application on a computing device of a user, wherein the user interaction data comprises one or more of key stroke dynamics data, navigation pattern data, or interaction pattern data;
inputting the user interaction data into a machine learning model to obtain, based on the user interaction data, a plurality of neurodiversity categories associated with the user, wherein the machine learning model is trained, using previously collected user interaction data, to identify categories of neurodiversity within the previously collected user interaction data;
generating a first set of user interface parameters comprising user interface parameters that are identical for each neurodiversity category of the plurality of neurodiversity categories;
merging non-matching user interface parameters into a second set of user interface parameters, wherein the non-matching user interface parameters are different for one or more neurodiversity categories of the plurality of neurodiversity categories obtained from the machine learning model;
generating a set of user interface parameters based on the first set of user interface parameters and the second set of user interface parameters;
generating a customized user interface based on the set of user interface parameters; and
generating a request to change a current user interface with the customized user interface.

3. The method of claim 2, further comprising:
adding the set of user interface parameters to the request; and
transmitting the request to the computing device, wherein the request causes the computing device to apply the set of user interface parameters to the current user interface.

4. The method of claim 2, wherein generating the customized user interface comprises:
receiving interface data associated with the current user interface;
inputting the interface data and the set of user interface parameters into an interface generation model to obtain updated interface data, wherein the interface generation model is trained to generate the updated interface data; and
generating the customized user interface based on the updated interface data.

5. The method of claim 2, further comprising:
generating an input vector for the machine learning model, wherein the input vector comprises corresponding key stroke dynamics data, corresponding navigation pattern data, and corresponding interaction pattern data; and
generating an embedding for the machine learning model using the input vector.

6. The method of claim 2, wherein retrieving the first set of user interface parameters comprises one or more of text display parameters, text content parameters, color parameters, or navigation parameters.

7. The method of claim 2, wherein the request comprises a prompt requesting that the user accept or deny the request to change the current user interface.

8. The method of claim 2, further comprising:
receiving a training dataset comprising a plurality of features, wherein the plurality of features comprises captured key stroke dynamics data, captured navigation pattern data, and captured interaction pattern data for a plurality of users, and wherein the training dataset comprises a target feature indicating one or more neurodivergent categories; and
inputting the training dataset into a training routine of the machine learning model to train the machine learning model to identify the one or more neurodivergent categories based on input data comprising one or more of the key stroke dynamics data, the navigation pattern data, or the interaction pattern data.

9. The method of claim 8, further comprising:
generating a plurality of embedding based on the captured key stroke dynamics data, the captured navigation pattern data, and the captured interaction pattern data.

10. The method of claim 2, further comprising:
determining a device type with which the user is interacting; and
modifying the customized user interface based on the device type.

11. The method of claim 2, further comprising:
in response to receiving the user interaction data, retrieving additional user interaction data associated with one or more applications associated with the user; and
modifying the user interaction data with the additional user interaction data.

12. One or more non-transitory, computer-readable media storing instructions thereon that cause one or more processors to perform operations comprising:
receiving user interaction data associated with an application on a computing device of a user;
inputting the user interaction data into a machine learning model to obtain, based on the user interaction data, a plurality of neurodiversity categories associated with the user, wherein the machine learning model is trained, using previously collected user interaction data, to identify categories of neurodiversity within the previously collected user interaction data;
generating a first set of user interface parameters comprising user interface parameters that are identical for each neurodiversity category of the plurality of neurodiversity categories;
merging non-matching user interface parameters into a second set of user interface parameters, wherein the non-matching user interface parameters are different for one or more neurodiversity categories of the plurality of neurodiversity categories obtained from the machine learning model;
generating a customized user interface based on the first set of user interface parameters and the second set of user interface parameters merged into a set of user interface parameters; and
generating a request to change a current user interface with the customized user interface.

13. The one or more non-transitory, computer-readable media of claim 12, wherein the instructions further cause the one or more processors to perform operations comprising:
adding the set of user interface parameters to the request; and
transmitting the request to the computing device, wherein the request causes the computing device to apply the set of user interface parameters to the current user interface.

14. The one or more non-transitory, computer-readable media of claim 12, wherein the instructions for generating the customized user interface, further cause the one or more processors to perform operations comprising:
receiving interface data associated with the current user interface;
inputting the interface data and the set of user interface parameters into an interface generation model to obtain updated interface data, wherein the interface generation model is trained to generate the updated interface data; and
generating the customized user interface based on the updated interface data.

15. The one or more non-transitory, computer-readable media of claim 12, wherein the instructions further cause the one or more processors to perform operations comprising:
generating an input vector for the machine learning model, wherein the input vector comprises corresponding key stroke dynamics data, corresponding navigation pattern data, and corresponding interaction pattern data; and
generating an embedding for the machine learning model using the input vector.

16. The one or more non-transitory, computer-readable media of claim 12, wherein the set of user interface parameters comprises one or more of text display parameters, text content parameters, color parameters, or navigation parameters.

17. The one or more non-transitory, computer-readable media of claim 12, wherein the request comprises a prompt requesting that the user accept or deny the request to change the current user interface.

18. The one or more non-transitory, computer-readable media of claim 12, wherein the instructions further cause the one or more processors to perform operations comprising:
receiving a training dataset comprising a plurality of features, wherein the plurality of features comprises captured key stroke dynamics data, captured navigation pattern data, and captured interaction pattern data for a plurality of users, and wherein the training dataset comprises a target feature indicating one or more neurodivergent categories; and
inputting the training dataset into a training routine of the machine learning model to train the machine learning model to identify the one or more neurodivergent categories based on input data comprising one or more of key stroke dynamics data, navigation pattern data, or interaction pattern data.

19. The one or more non-transitory, computer-readable media of claim 18, wherein the instructions further cause the one or more processors to generate a plurality of embedding based on the captured key stroke dynamics data, the captured navigation pattern data, and the captured interaction pattern data.

\* \* \* \* \*